(12) United States Patent
Ebert et al.

(10) Patent No.: US 7,510,148 B2
(45) Date of Patent: Mar. 31, 2009

(54) DYNAMIC YAW STEERING METHOD FOR SPACECRAFTS

(75) Inventors: Klaus Ebert, Ottobrunn (DE); Wilfried Oesterlin, Feldkirchen-Westerham (DE)

(73) Assignee: Astrium GmbH, Munich (DE)

( * ) Notice: Subject to any disclaimer, the term of this patent is extended or adjusted under 35 U.S.C. 154(b) by 216 days.

(21) Appl. No.: 11/585,831

(22) Filed: Oct. 25, 2006

(65) Prior Publication Data

US 2007/0090229 A1 Apr. 26, 2007

Related U.S. Application Data

(63) Continuation of application No. 10/968,166, filed on Oct. 20, 2004, now Pat. No. 7,143,982.

(30) Foreign Application Priority Data

Oct. 21, 2003 (EP) .................................. 03024205

(51) Int. Cl.
  *B64G 1/10* (2006.01)
(52) U.S. Cl. ...................................... 244/164
(58) Field of Classification Search ............. 244/158.4, 244/158.6, 164, 165; 701/13; 342/355
  See application file for complete search history.

(56) References Cited

U.S. PATENT DOCUMENTS

| 5,791,598 | A | 8/1998 | Rodden et al. |
| 5,794,891 | A | 8/1998 | Polle et al. |
| 6,164,597 | A | 12/2000 | Barker et al. |
| 6,293,502 | B1 | 9/2001 | Fowell |
| 6,311,932 | B1 | 11/2001 | Rodden et al. |
| 6,470,243 | B1 | 10/2002 | Eyerly et al. |

FOREIGN PATENT DOCUMENTS

| EP | 0785132 | 7/1997 |
| EP | 1167189 | 1/2002 |

OTHER PUBLICATIONS

L. Barker et al., "Sirius Satellite Design: The Challenges of the Tundra Orbit in Commercial Spacecraft Design", Guidance and Control 2001, Proceedings of the Annual AAS Rocky Mountain Conference, Jan. 31, 2001, pp. 575-596.

W. Bao, "Matlab Quick Reference," XP-002275236, Jul. 2001, downloaded on Mar. 26, 2004 from URL:http://www.cz3.nus.edu.sg{bao/teach/cz4206/matqkref.pdf.

*Primary Examiner*—Rob Swiatek
(74) *Attorney, Agent, or Firm*—Greenblum & Bernstein, P.L.C.

(57) ABSTRACT

A spacecraft with a yaw steering system performing yaw steering. The yaw steering includes steering the spacecraft to have a yaw angle ($\psi$) for all sun elevation angles ($\beta$) in accordance with a yaw steering guidance law that provides a yaw steering motion about a yaw axis which is smooth for all sun elevation angles ($\beta$). At least part of the guidance law comprises a smoothing function (f), which is a function of an orbital position parameter ($\eta$) of the spacecraft, the smoothing function (f) smoothing the yaw steering motion for values of the orbital position parameter ($\eta$) where high rotational rates $\dot{\psi}$ or high rotational accelerations $\ddot{\psi}$ would occur without the smoothing function (f).

4 Claims, 11 Drawing Sheets

DYNAMIC YAW STEERING METHOD FOR SPACECRAFTS

CROSS-REFERENCE TO RELATED APPLICATIONS

The present application is a continuation of U.S. patent application Ser. No. 10/968,166 filed Oct. 20, 2004, now U.S. Pat. No. 7,143,982 issued Dec. 5, 2006, and claims priority under 35 U.S.C. §119 of European Patent Application No. EP 03 024 205.1, filed on Oct. 21, 2003, the disclosures of which are expressly incorporated by reference herein in their entireties.

BACKGROUND OF THE INVENTION

1. Field of the Invention

Figure 1:
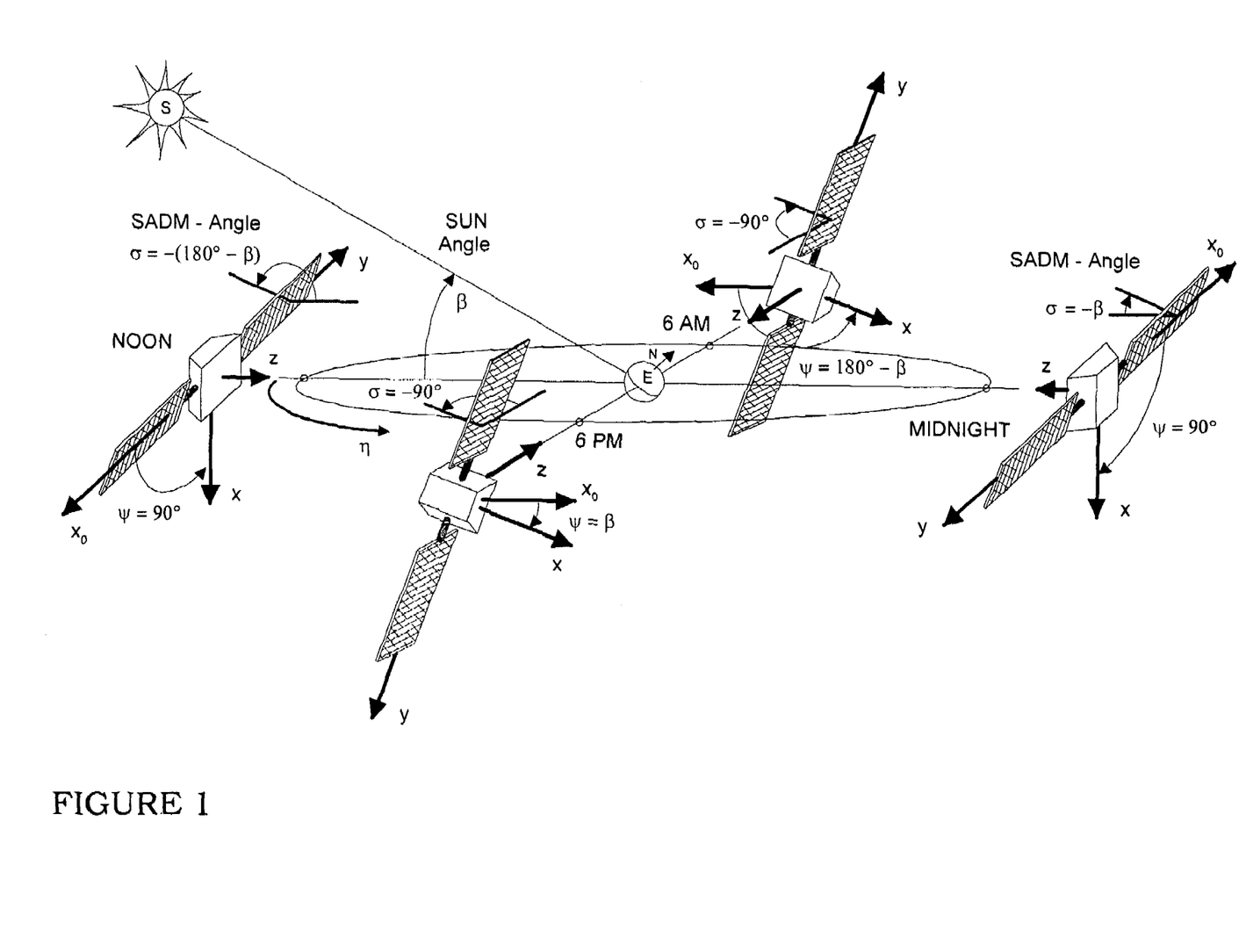
FIG. 1 shows yaw steering geometry.

The invention relates to a method for yaw steering of a spacecraft, i.e. for satellites, space stations, and the like. Moreover the present invention relates to the basic idea that temporal characteristics of the acceleration about a yaw axis are continuous for all sun elevation angles $\beta$, which is defined as the angle of the sun above an orbital plane of the spacecraft as shown in FIG. 1.

2. Discussion of Background Information

State of the art methods only provide a yaw steering for high sun elevation angles $\beta$ and do not provide any yaw steering for low or zero elevation angles at all or they show a discontinuous temporal behavior of the acceleration about the yaw axis. Such state of the art methods are disclosed in Barker L., Stoen J.: "Sirius satellite design: The challenges of the Tundra orbit in commercial spacecraft design", Guidance and Control 2001, Proceedings of the annual AAS Rocky Mountain conference, 31 Jan. 2001, p. 575-596.

SUMMARY OF THE INVENTION

In particular, a first aspect of the invention refers to a method for yaw steering of a spacecraft, including performing yaw steering of the spacecraft yaw angle $\psi$ for all sun elevation angles $\beta$ and smoothing the yaw steering motion for values of the orbital position parameter where high rotational rates $\dot{\psi}$ and/or rotational accelerations $\ddot{\psi}$ would occur.

A second aspect of the invention refers to a method for yaw steering of a spacecraft, in that yaw steering of the spacecraft yaw angle $\psi$ is effected for all sun elevation angles $\beta$ and that a yaw steering guidance law is applied which is designed such that the steering motion about the yaw axis is smooth for all sun elevation angles $\beta$, whereby at least part of the guidance law comprises a smoothing function (f) being a function of an orbital position parameter of the spacecraft, the smoothing function smoothing the yaw steering motion for values of the orbital position parameter where high rotational rates $\dot{\psi}$ and/or rotational accelerations $\ddot{\psi}$ would occur without application of the smoothing function.

Preferably at least part of the yaw steering guidance law is based on a smoothing function being a function of an orbital position parameter of the spacecraft, where the orbital position can for example be expressed as an angle $\eta$, as shown in FIG. 1.

It can be provided that a first part of the attitude guidance law is applied for all sun elevation angles bigger or equal to a defined sun elevation angle $\beta_0$, this first part of the guidance law being independent of smoothing function, and that a second part of the attitude guidance law is applied for all sun elevation angles smaller than a defined sun elevation angle. This second part of the guidance law is based on smoothing function. So two parts are provided for the guidance law which can be optimized separately and designed specifically for the respective ranges of incident angles. It can also be provided that both parts of the guidance law are of the same form and/or structure and/or contain the same functions, in particular the smoothing function, but the smoothing function being a factor equal to one or an additive component being equal to zero in the first part of the guidance law.

In particular, the first part of the guidance law can comprise a standard yaw steering law $\psi = a\tan2(\tan\beta, \sin\eta)$ being a function of the sun elevation angle $\beta$ and the orbital position parameter $\eta$, and the second part of the guidance law can comprise a modified yaw steering law $\psi = a\tan2(\tan\beta_d, \sin\eta)$ being a function of the orbital position parameter $\eta$ and a sun elevation angle parameter $\beta_d$ being a function of the smoothing function and the sun elevation angle $\beta$. The defined sun elevation angle $\beta_0$ can in particular be chosen as the angle $\beta_0$ for which the maximum limits of the rotational rates $\dot{\psi}$ and/or rotational accelerations $\ddot{\psi}$ are reached for the spacecraft when the standard yaw steering law $\psi = a\tan2(\tan\beta, \sin\eta)$ is applied.

Preferably, the yaw steering motion is smoothed for orbit angles $\eta = k \cdot 180°$ ($k = 0, 1, 2 \ldots$). It is especially for those angles that high rotational rates $\dot{\psi}$ and rotational accelerations $\ddot{\psi}$ can occur, so respective smoothing of the yaw steering motion is effected in order to avoid such high rotational rates $\dot{\psi}$ and rotational accelerations $\ddot{\psi}$.

It can be further provided, that the smoothing function comprises a design parameter which can be adapted in order to optimize the smoothing effect of smoothing function. This design parameter can be adapted once before launching the guidance law or even dynamically for dynamic optimization.

Furthermore, a smooth transient between a positive yaw steering shape for $\beta > 0$ and a negative yaw steering shape for $\beta < 0$ is preferably performed at a sun elevation angle $\beta \cong 0$ and at an orbit angle $\eta = 90°$. Such a smooth transient for an angle $\beta \cong 0$ is desired in order to maintain a smooth yaw steering motion. The orbit angle $\eta = 90°$ was found to be a very advantageous point for such a transient.

It can be further provided that the attitude control law is designed such that a first panel of the satellite body structure is always directed away from the sun, or at least directed such that the incident sun angle on that panel is very small, preferably smaller than 5°, in particular smaller than 2°. In particular, the plane defined by the first panel can be oriented parallel to the yaw axis of the satellite. So for example, this panel can be the panel shown in FIG. 1 to which the positive x-axis forms the normal.

It can be further provided that the attitude control law is designed such that a second and third panel of the satellite body structure always have an incident sun angle smaller than a defined angle, preferably smaller than 5°, in particular smaller than 2°. These panels can in particular be the panels being more or less perpendicular to the y-axis as shown in FIG. 1.

One preferred smoothing function f can be chosen as:

$$f = \frac{\cos^2\eta}{1 + d \cdot \sin^2\eta}$$

which fulfils the above-mentioned requirements of a smoothing function. In particular, the smoothing function can be adapted by changing the design parameter d such that the function has very sharp maxima in a very limited region, which leads to a high smoothing effect in that particular region, and that the function is close to zero in a very broad region which leads to a neglectable smoothing effect in that region. But the invention is not limited to this particular smoothing function. Other functions fulfilling these requirements can be chosen within the scope of the invention.

In particular, the guidance law can based on the following functions: for $|\beta| \geq \beta_0$:

(1) $f = 0$ and for $|\beta| < \beta_0$:

(2) $f = \dfrac{\cos^2 \eta}{1 + d \cdot \sin^2 \eta}$ (3) $\beta_d = \beta + f \cdot (\beta_0 \cdot \delta - \beta), \delta = \pm 1$ (4) $\psi = \operatorname{atan2}(\tan\beta_d, \sin\eta)$ The expression of a tan 2 (x, y) (or arc tan (x, y) which is used in the example below in the identical sense) refers to a technically well known function returning values of an inverse tangent $\tan^{-1}$ (x/y) in the interval of $[-\pi, \pi]$, in contrast to a tan (x/y) which returns values only in the interval of $[-\pi/2, \pi/2]$.

For $\beta=\beta_0$ the transient between the first part of the guidance law (Kinematic Yaw Steering) and the second part of the guidance law (Dynamic Yaw Steering) is obtained in a continuous way.

By varying the design parameter d as mentioned above, it can in particular be achieved that for $|\beta|<\beta_0$ and in a certain range around the critical orbit angle $\eta=0°, 180°, 360°, \ldots$, $\beta_d \rightarrow \beta_0$ results. Thus, the yaw steering motion is smoothed to the behavior like for the critical Sun elevation angle $\beta_0$, which is the "lower" limit of the Kinematic Yaw Steering profile, being per definition in-line with the spacecraft actuation system capabilities.

For $|\beta|<\beta_0$ and in the dynamically non-critical rest period along the orbit angle, the yaw steering motion is performed as for $\beta_d \rightarrow \beta$, which is close to the standard kinematic solution.

In one aspect of the invention a method for yaw steering a spacecraft including performing yaw steering of the spacecraft to have a yaw angle ($\psi$) for all sun elevation angles ($\beta$). The method further including smoothing a yaw steering motion for orbital position parameters ($\eta$) where high rotational rates $\dot\psi$ and high rotational accelerations $\ddot\psi$ would occur.

In a further aspect of the invention, high rotational rates $\dot\psi$ can be rotational rates exceeding a predetermined rotational rate and high rotational accelerations $\ddot\psi$ can be rotational accelerations exceeding a predetermined rotational acceleration. Moreover, the yaw steering motion can be smoothed for orbit angles $\eta=k\cdot180°$ (where $k=0, 1, 2, \ldots$). Additionally, the smoothing function (f) can include a design parameter (d) which is configured to optimize a smoothing effect of the smoothing function (f). Furthermore, a smooth transient between a positive yaw steering shape for $\beta>0$ and a negative yaw steering shape for $\beta<0$ can be performed at a sun elevation angle $\beta \cong 0$ and at an orbit angle $\eta=90°$. Moreover, the yaw steering can be performed such that a first panel of a satellite body structure is always directed away from the sun. Additionally, a plane defined by the first panel can be oriented parallel to a yaw axis of the satellite. Furthermore, the yaw steering can be performed such that a second and a third panel of a satellite body structure always have an incident sun angle smaller than a predetermined angle. Moreover, the smoothing function (f) can be defined as:

$$f = \dfrac{\cos^2\eta}{1 + d \cdot \sin^2\eta}.$$

Additionally, the guidance law can be based on the following functions: for $|\beta| \geq \beta_0$:

(1) $f = 0$ and for $|\beta| < \beta_0$:

(2) $f = \dfrac{\cos^2\eta}{1 + d \cdot \sin^2\eta}$ (3) $\beta_d = \beta + f \cdot (\beta_0 \cdot \delta - \beta), \delta = \pm 1$ (4) $\psi = \operatorname{atan2}(\tan\beta_d, \sin\eta)$ Yet another aspect of the invention includes a method for yaw steering a spacecraft including steering the spacecraft to have a yaw angle ($\psi$) for all sun elevation angles ($\beta$) in accordance with a yaw steering guidance law that provides a yaw steering motion about a yaw axis which is smooth for all sun elevation angles ($\beta$). Moreover, at least part of the guidance law comprises a smoothing function (f), which is a function of an orbital position parameter ($\eta$) of the spacecraft, the smoothing function (f) smoothing the yaw steering motion for values of the orbital position parameter ($\eta$) where high rotational rates $\dot\psi$ or high rotational accelerations $\ddot\psi$ would occur without the smoothing function (f).

In a further aspect of the invention high rotational rates $\dot\psi$ can be rotational rates exceeding a predetermined rotational rate and high rotational accelerations $\ddot\psi$ can be rotational accelerations exceeding a predetermined rotational acceleration. Moreover, a first part of the guidance law can be applied for all sun elevation angles ($\beta$) larger or equal to a defined sun elevation angle ($\beta_0$), in which the first part of the guidance law is independent of the smoothing function (f), and a second part of the guidance law is applied for all sun elevation angles ($\beta$) smaller than a defined sun elevation angle ($\beta_0$), in which the second part of the guidance law is based on smoothing function (f). Furthermore, a first part of the guidance law can include a standard yaw steering law $\psi=a \tan 2(\tan \beta, \sin \eta)$, which is a function of the sun elevation angle ($\beta$) and the orbital position parameter ($\eta$), and a second part of the guidance law comprises a modified yaw steering law $\psi=a \tan 2(\tan \beta_d, \sin \eta)$ which is a function of the orbital position parameter ($\eta$) and a sun elevation angle parameter ($\beta_d$) and is a function of the smoothing function (f) and the sun elevation angle ($\beta$). Moreover, a spacecraft can have a yaw steering system performing the yaw steering method noted above.

A further aspect of the invention includes a method for yaw steering a spacecraft including performing yaw steering of the spacecraft to have a yaw angle for all sun elevation angles. The method further including reducing rotational rates or rotational accelerations below a predetermined value by smoothing a yaw steering motion at predetermined orbital position parameters.

In a further aspect of the invention the method includes steering the spacecraft with a yaw steering guidance law which provides a yaw steering motion about a yaw axis. Moreover at least part of the guidance law comprises a smoothing function that is a function of an orbital position parameter of the spacecraft, the smoothing function smoothing the yaw steering motion. Additionally, the method can include a first part of the guidance law is applied for all sun elevation angles larger or equal to a defined sun elevation angle, in which the first part of the guidance law is independent of the smoothing function, and a second part of the guidance law is applied for all sun elevation angles smaller than a defined sun elevation angle, in which the second part of the guidance law is based on smoothing function. Moreover, a spacecraft can use the yaw steering method noted above.

The following detailed description and the corresponding figures show a specific embodiment of the invention concerning a yaw steering method for satellites.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

This example presents a special Yaw Steering Guidance Law for a spacecraft (spacecraft) as applicable for the Galileo System Testbed GSTB-V2, where: spacecraft continuous nadir pointing is performed with one selected axis (z-axis); spacecraft rotation is performed around the nadir pointed axis in order to orient the spacecraft solar array normal in an optimal way towards the Sun, based on a state-of-the-art one-axis solar array drive mechanism; One selected spacecraft panel (+x panel) perpendicular to the nadir line and to the solar array axis is oriented such, that Sun incidence is avoided (with the exception of sliding incidence); and The two spacecraft panels (y-panels), the panel normal of which is parallel to the solar array axes, are illuminated from the Sun with an incidence angle less than a predefined critical angle.

Introduction to Yaw Steering

In order to optimize the electric power generation from the solar arrays, the solar array active plane has to be oriented perpendicular to the sun line. Otherwise, the available power would approximately be reduced with the cosine of the Sun incidence angle. Based on an Earth pointed platform, the solar array pointing requires two independent rotations in general. In order to avoid rather complex two-axes Solar Array Drive Mechanisms (SADM), two well-known types of operation are established, depending on the Sun elevation with respect to the orbit plane:

Zero (or at least near zero) inclination, applicable for all GEO spacecraft, where the Sun elevation with respect to the orbit plane is $\leq 23.44°$: only one rotation is performed with a maximum power loss of about 8.3%. The spacecraft is operated at a constant (0°, 180°) yaw angle ("constant yaw") with the solar array axis oriented parallel to the orbit normal. Only the solar panel is rotated around its longitudinal axis using an one-axis SADM; and non-zero inclination, applicable for most LEO and MEO satellites, where the Sun elevation with respect to the orbit plane changes in a wide range $|\beta| \leq 23.44° + i$ (i=inclination): the first rotation is performed by the spacecraft itself, where the satellite is rotated around its Earth pointing yaw-axis (z-axis, "yaw steering") orienting the spacecraft x/z-plane parallel to the Sun line (i.e. Solar array axis and spacecraft y-axis perpendicular to the Sun line). For the second rotation again an off-the-shelf one-axes SADM is used, rotating the solar panel around its longitudinal axis.

Yaw Steering—Kinematic Yaw Steering

The Yaw Steering law is derived from pure geometric relations as indicated in FIG. 1.

According to FIG. 1 the following "kinematic" yaw steering law can be derived (Note: arc tan(x,y) in the notation here (similar to MAPLE) corresponds to the well-known function a tan 2(x,y) as used in higher computer languages, e.g. FORTRAN, Matlab, . . . ):

$$\psi = \arctan(\tan\beta, \sin\eta) \qquad \text{(eq. 3.1-1)}$$
$$\sigma = \arctan(-\sqrt{1-\cos^2\beta \cdot \cos^2\eta}, -\cos\beta \cdot \cos\eta),$$

where (according to the above figure):
$\eta = \eta(t)$ describes the orbit in-plane motion ($\eta=0$ is obtained from the projection of the Sun line to the orbit plane);
$\beta = \beta(t)$ is the sun elevation with respect to the orbit plane;
$\psi(t)$ is the spacecraft reference yaw angle with respect to the LVLH coordinate system (z axis pointing towards the Earth center); and
$\sigma(t)$ is the solar array drive mechanism (SADM) rotation angle (for $\sigma=0$ the solar panel normal points parallel to the spacecraft z-axis).

Figure 2:
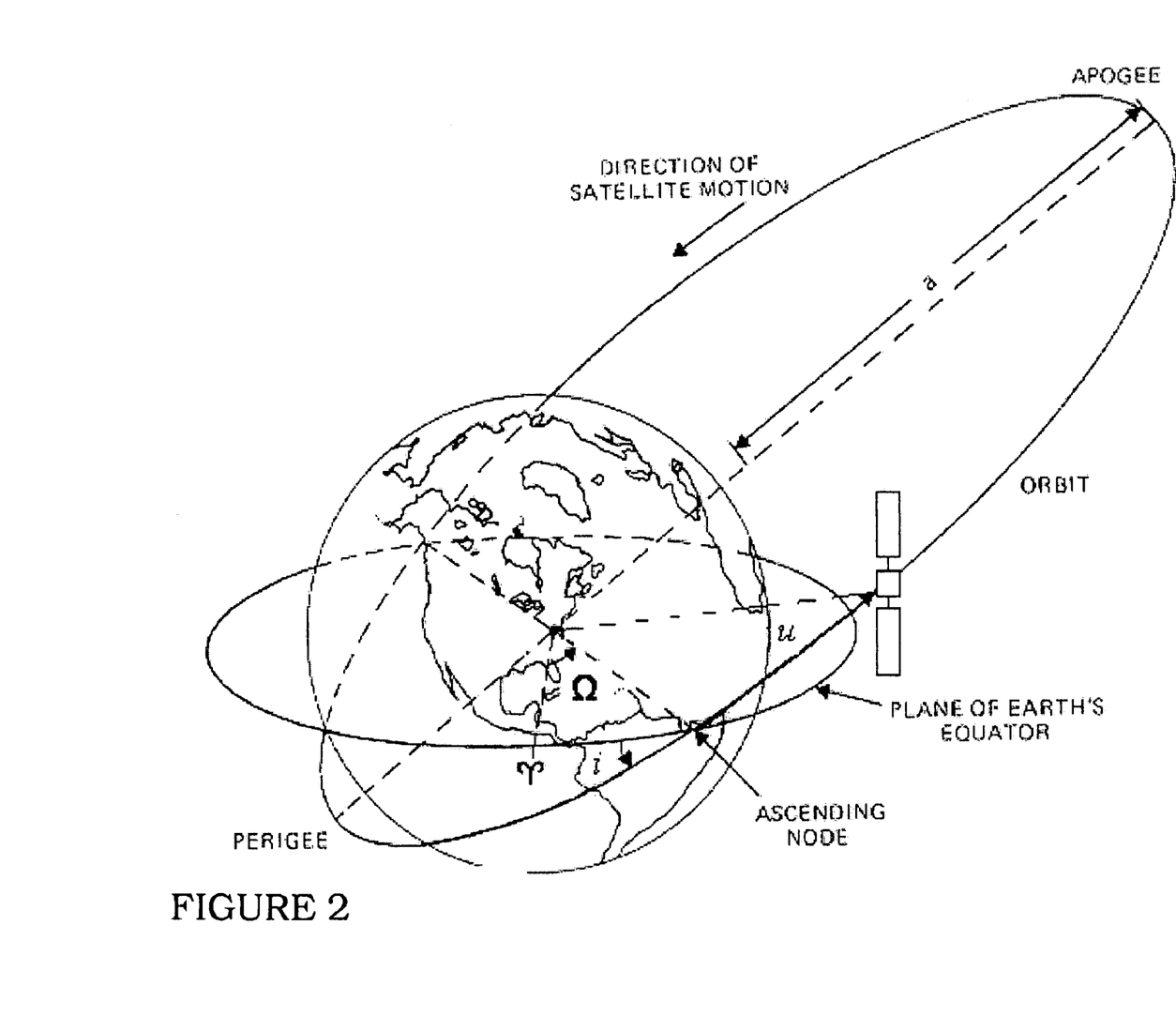
FIG. 2 shows orbit parameter (modified from J.R. Wertz)
Figure 3:
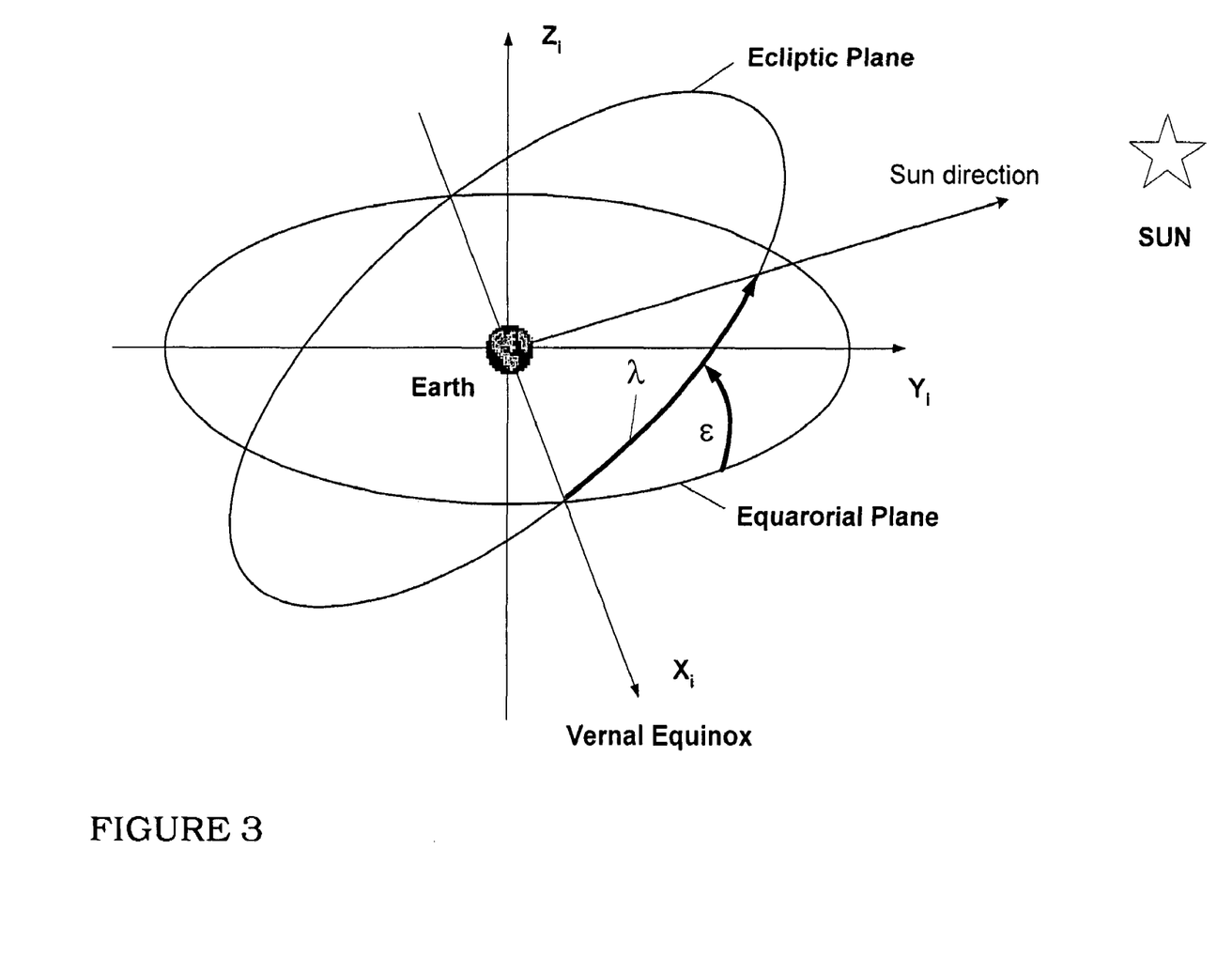
FIG. 3 shows sun parameter.

The transformation to the usual Orbit and Sun parameter is given in FIG. 2 (e.g. in an inertial frame centered in the Earth, X pointing towards Vernal Equinox γ, Z pointing to the North and Y augmenting to a right-hand system)

where:
- Ω—Right ascension of ascending node (RAAN);
- i—Orbit inclination angle;
- u—Argument of latitude;
- ε=23.44°—Obliquity of ecliptic; and
- λ—Sun seasonal angle (λ angle determined in the ecliptic plane, λ=0° at Vernal Equinox, see FIG. 3).

The relevant yaw steering angles β and η can be calculated from:

$$\beta = \arcsin(\sin\varepsilon \cdot \sin\lambda \cdot \cos i + \cos\lambda \cdot \sin\Omega \cdot \sin i - \cos\varepsilon \cdot \sin\lambda \cdot \cos\Omega \cdot \sin i)$$

$$u_0 = \arctan((\cos\Omega \cdot \cos i \cdot \cos\varepsilon \cdot \sin\lambda + \sin i \cdot \sin\varepsilon \cdot \sin\lambda - \sin\Omega \cdot \cos i \cdot \cos\lambda), (\cos\Omega \cdot \cos\lambda + \sin\Omega \cdot \cos\varepsilon \cdot \sin\lambda))$$

$$\eta = u - u_0 \qquad \text{(eq. 3.1-2)}$$

Neglecting seasonal variation and orbit plane motion during a certain time period, obtains approximately for a circular orbit with orbital rate $\omega_0$:

$$\dot{\eta}(t) \approx \omega_0 = const. \qquad \text{(eq. 3.1-3)}$$
$$\beta(t) \approx const.$$

The key element concerning yaw steering dynamics is the elevation angle β. For GSTB-V2 and GalileoSat (orbit inclination i=56.0°) the total variation is $0° \leq |\beta| \leq 79.44°$. If the kinematic yaw-steering law would be applied for the complete range of β, a singularity would occur for β=0° and η=0°, 180°, requiring indefinite spacecraft and SADM rotational rates and rotational accelerations, or at least high rates and accelerations for β≈0°. Thus, special measures have to be applied in a predefined band $|\beta| \leq \beta_0$, assuming this band centered about β=0°.

Yaw Steering Options for Small Sun Elevation—Constant Yaw

If only power constraints are considered, for β=0° the solar array planes can be oriented perpendicular to the Sun by only one (SADM) rotation, if the satellite y-axis is pointed (constantly) perpendicular to the orbit plane (like a "standard" spacecraft, e.g. GEO zero inclination applications). If the elevation angle β is in the predefined band $\pm\beta_0$, this "standard" attitude will be maintained ("Constant Yaw", ψ=0°), however on the cost of a slight power loss as indicated above for the GEO applications proportional to 1−cos (β). Typical values are $\beta_0=10°$, resulting in a tolerable power degradation of about 1.5% and moderate spacecraft agility and SADM motion requirements.

Based on thermal requirements (explained in more detail below), for the GSTB-V2 and Galileo the critical Sun elevation angle is reduced to $\beta_0=2°$. In the following figures, selected situations for maximum, critical ±ε (ε—"arbitrary small value") and minimum magnitude Sun elevation angle are presented for the GalileoSat and GSTB-V2 orbit, separated for β≧0 as well as for β≦0. However, these figures are only sketched here as an example. At the critical positive elevation, where $\beta=\beta_0$ we obtain $\psi_{max}=178°$ and $\sigma_{max}=0.007°/s$. For the "critical orbit angle" η=0°, 180°, 360°, . . . , we get $\dot\psi_{max}=0.2°/s$, $\ddot\psi_{max}=7.8$ μrad/s. It is obvious, that the yaw steering profiles for β≧0 and β≦0 provide different, but symmetric shapes with respect to the ψ=0° line, here referred to as the "positive yaw steering shape" and the "negative yaw steering shape." The transition between both types can easily be performed e.g. in a certain area near η=90°, starting from constant yaw.

Figure 4:
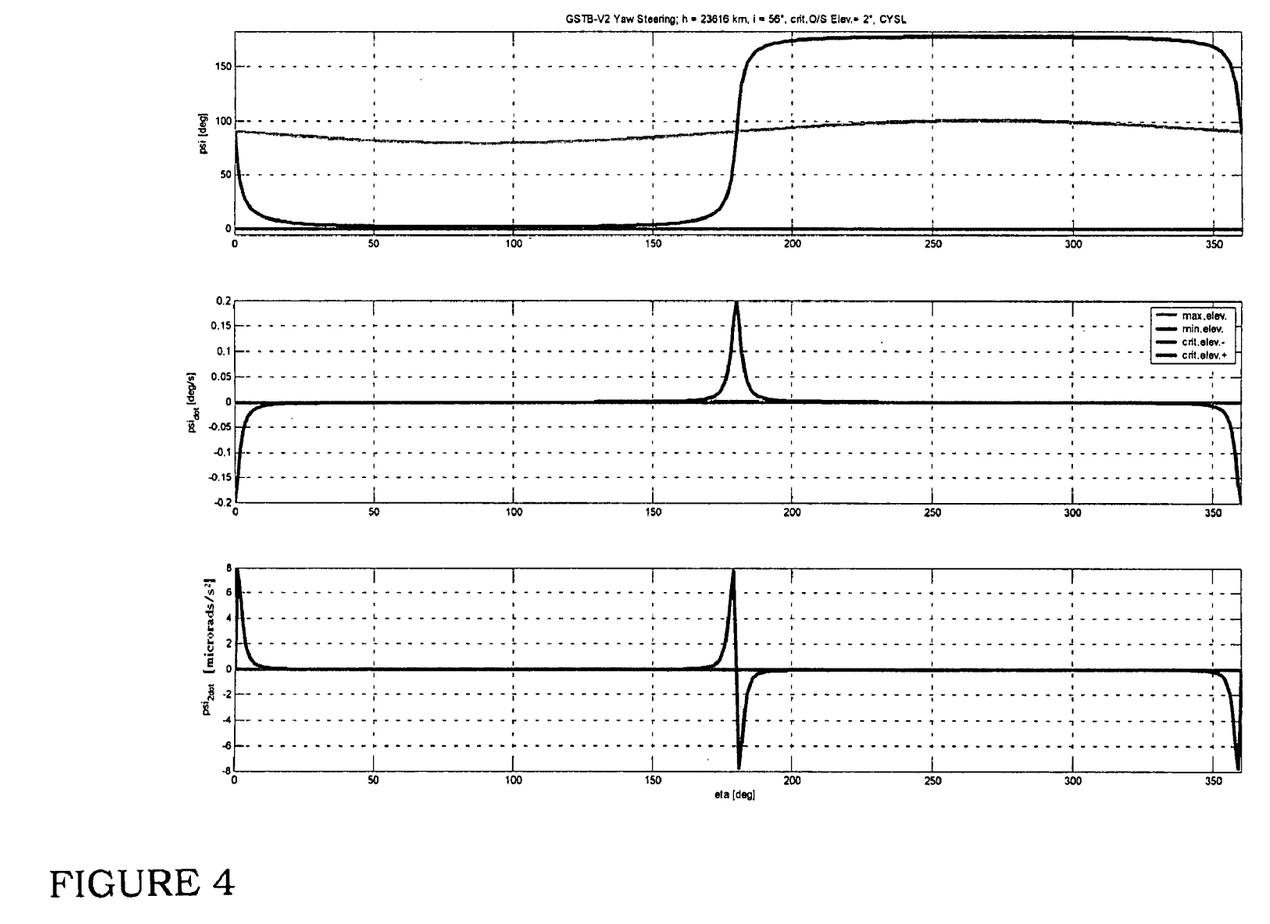
FIG. 4 shows spacecraft motion for constant yaw steering option ($\beta \geq 0$)
Figure 5:
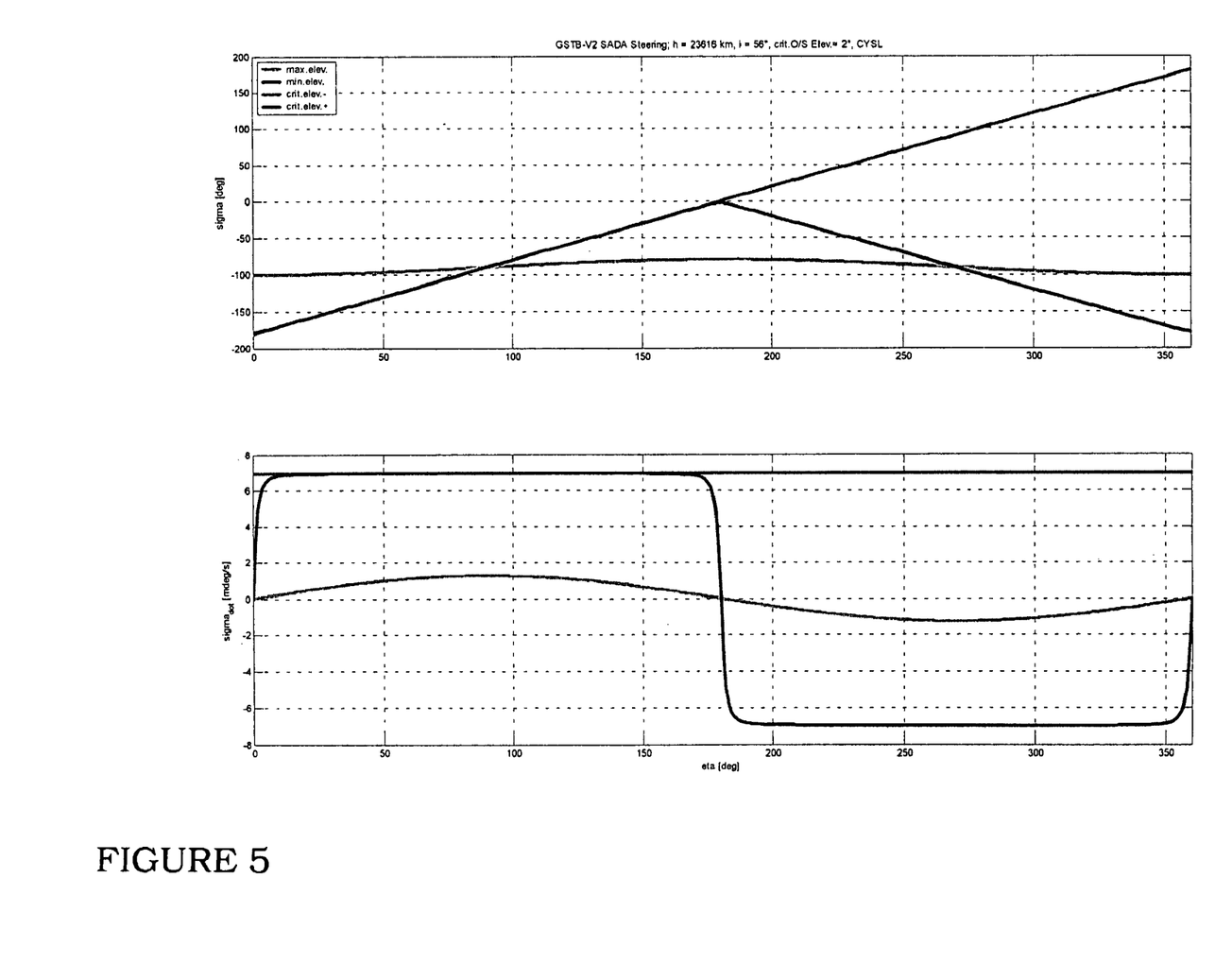
FIG. 5 shows SADM motion for constant yaw steering option ($\beta \geq 0$)
Figure 6:
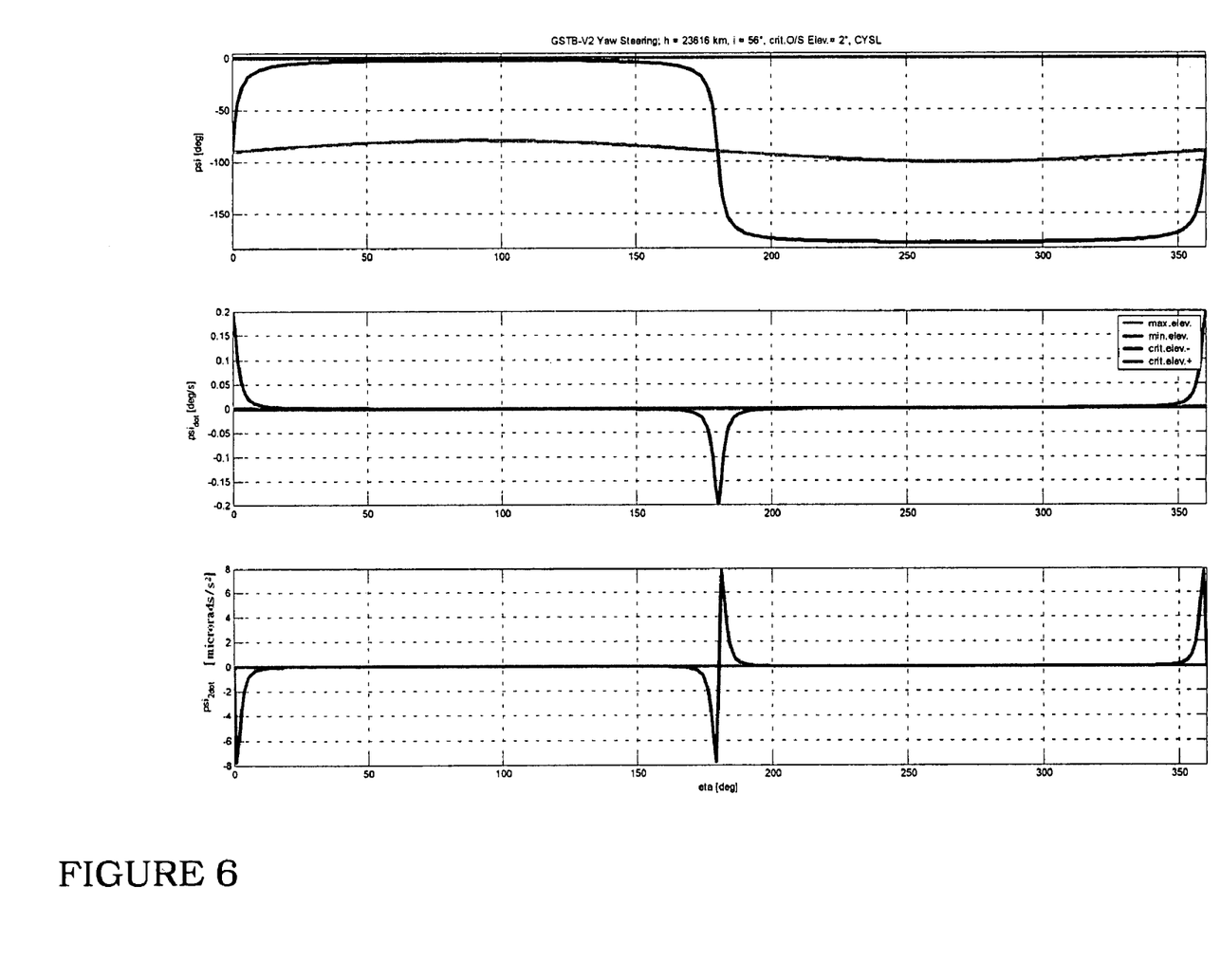
FIG. 6 shows spacecraft motion for constant yaw steering option ($\beta \leq 0$)
Figure 7:
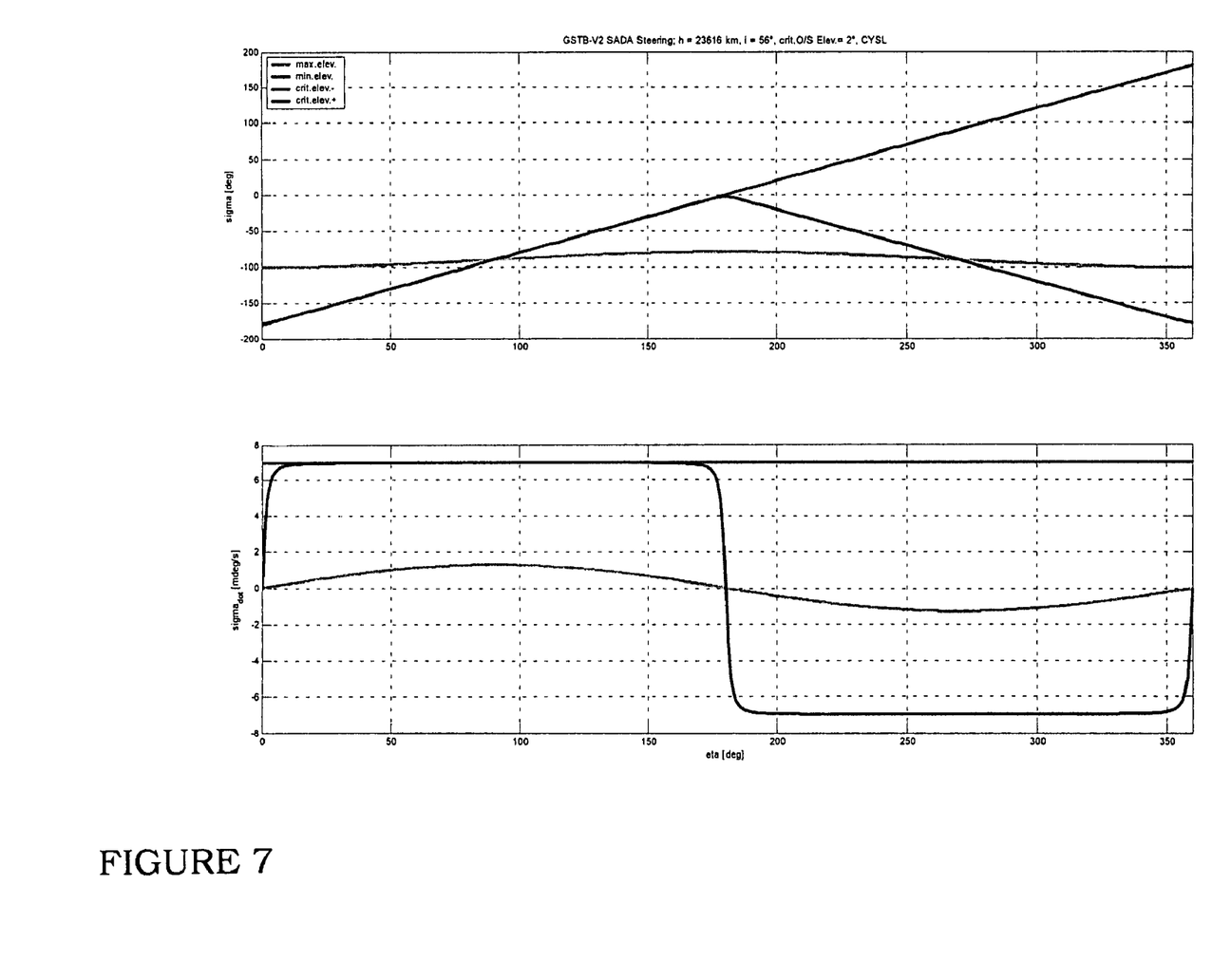
FIG. 7 shows a SADM motion for constant yaw steering option ($\beta \leq 0$)

With respect to FIGS. 4-7: FIG. 4 shows the spacecraft motion for Constant Yaw Steering Option (β≧0); FIG. 5 shows the SADM motion for Constant Yaw Steering Option (β≧0); FIG. 6 shows the spacecraft motion for Constant Yaw Steering Option (β≦0); and FIG. 7 shows the SADM motion for Constant Yaw Steering Option (β≦0).

Modified Kinematic Yaw Steering

Due to thermal constraints for GSTB-V2 and for Galileo-Sat two major additional requirements have to be considered, which significantly influence the yaw steering scenario: no Sun incidence on the spacecraft +x panel shall occur (with the exception of slipping incidence); and Sun incidence on the spacecraft ±y panel shall be less than 2°.

From the first requirement it can be concluded, that yaw steering, however modified and however taking into account the system actuation capabilities, has to be performed at any time, independent of the Sun elevation. The second requirement puts constraints on the critical angle $\beta_0$, where the transition from Kinematic Yaw Steering law to the modified yaw steering law in the band $|\beta| \leq \beta_0$ should take place.

Next, detailed information on how the two above requirements will be discussed together with the spacecraft actuation capabilities can be combined by a dynamically shaped yaw steering law, shortly referenced here as "Dynamic Yaw Steering."

Dynamic Yaw Steering—Dynamic Yaw Steering Law

The basic idea concerning yaw steering in the critical band $|\beta| \leq \beta_0$ is, to limit the spacecraft angular motion requirements at orbit angles η=0, 180°, 360°, . . . (see the above-noted figures). For β=0°, in an ideal case, a Δψ=180° spacecraft flip within an infinitesimal small time instant would be required, meaning that indefinite spacecraft rate and acceleration would occur. In reality, of course, only very limited spacecraft rate and angular acceleration are feasible due to the actuation system limited capabilities, i.e. torque and angular momentum limits of the reaction wheels.

Several options could be applied, such as a simple "bang-bang" type maximum acceleration (with predefined torque limits) and with limited maximum angular rate. However, excitation of solar array oscillation as well as fuel sloshing motion should be avoided. Furthermore, for gyro-less Normal Mode operation, smooth type actuation is preferable, too.

Among a lot of dynamically smooth yaw steering laws, the following has basically been selected for the critical band $|\beta| \leq \beta_0$. However, a special procedure has to be applied approaching β=0 (according to a change in sign for β), where a smooth transient between the positive and negative yaw steering shape has to be applied (switching logic for δ see the further chapter for details).

$$-\beta_0 \leq \beta \leq \beta_0 : \psi = \arctan(\tan\beta_d, \sin\eta)$$

$$\beta_d = \beta + f \cdot (\beta_0 \cdot \delta - \beta), \delta = \pm 1 \qquad \text{(eq. 3.3.1-1)}$$

$$f = \frac{\cos^2\eta}{1 + d \cdot \sin^2\eta}, \quad d\text{-design parameter}$$

It should be mentioned, that the SADM steering law remains unchanged compared to the kinematic law presented in eq. 3.1-1.

Figure 8:
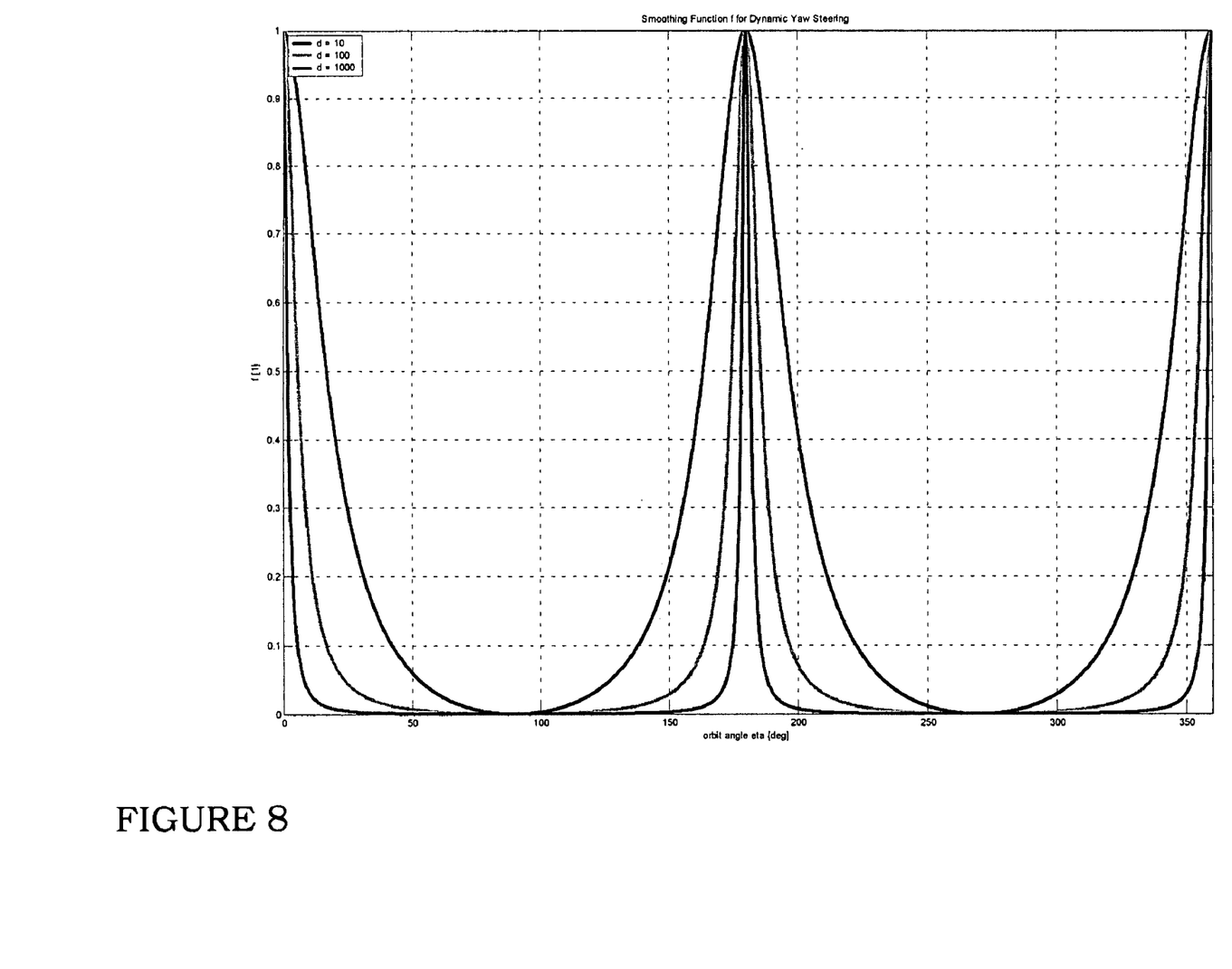
FIG. 8 shows a smoothing function $f=f(\eta)$ for dynamic yaw steering.

The smoothing function $f=f(\eta)$ is sketched in FIG. 8 including typical values for d as parameter:

The basic idea of the Dynamic Yaw Steering profile can be explained with FIG. 8 together with eq. 3.3.1-1: For $\beta=\beta_0$ the transient between Kinematic and Dynamic Yaw Steering solution is obtained in a continuous way; For $|\beta|<\beta_0$ and in a certain range around the critical orbit angle $\eta=0°$, $180°$, $360°$, . . . , $\beta_d \rightarrow \beta_0$ is obtained. Thus, the yaw steering motion is smoothed to the behavior like for the critical Sun elevation angle $\beta_0$, which is the "lower" limit of the Kinematic Yaw Steering profile, being per definition in-line with the spacecraft actuation system capabilities; and for $|\beta|<\beta_0$ and in the dynamically non-critical rest period along the orbit angle, the yaw steering motion is performed as for $\beta_d \rightarrow \beta$, which is close to the standard kinematic solution.

Such a solution provides the advantage of a smooth yaw steering motion, avoiding any discontinuities for the yaw steering angle as well as for rate and angular acceleration, and thus also for the actuation torques.

Design of Dynamic Yaw Steering Law Parameter

One major design parameter has to be optimized for the given mission orbit, which is the parameter d in eq. 3.3.1-1. The basic idea is, not to exceed the actuation requirements from Kinematic Yaw Steering at its limits for $\beta=\beta_0$. Instead of an analytic way a rather pragmatic solution is presented here for determination of the optimum parameter:

Determination of dimensioning (but feasible) Kinematic Yaw Steering rotational motion requirements in terms of maximum angular rate $\dot{\psi}_{max}$ and angular acceleration $\ddot{\psi}_{max}$ by numerical evaluation of $\dot{\psi}=\dot{\psi}(\eta)$ and $\ddot{\psi}=\ddot{\psi}(\eta)$ for $\beta=\beta_0$);

Determination of dimensioning Dynamic Yaw Steering rotational motion requirements in terms of maximum angular rate $\dot{\psi}_{max,d}$ and angular acceleration $\ddot{\psi}_{max,d}$ by numerical evaluation of $\dot{\psi}=\dot{\psi}(\eta)$ and $\ddot{\psi}=\ddot{\psi}(\eta)$ for $\beta=0$ and given parameter d; and Perform proper variation of d and select the optimum parameter such, that $\dot{\psi}_{max,d} \leq \dot{\psi}_{max}$ as well as $\ddot{\psi}_{max,d} \leq \ddot{\psi}_{max}$, where at least one constraint should be fulfilled as equality.

Figure 9:
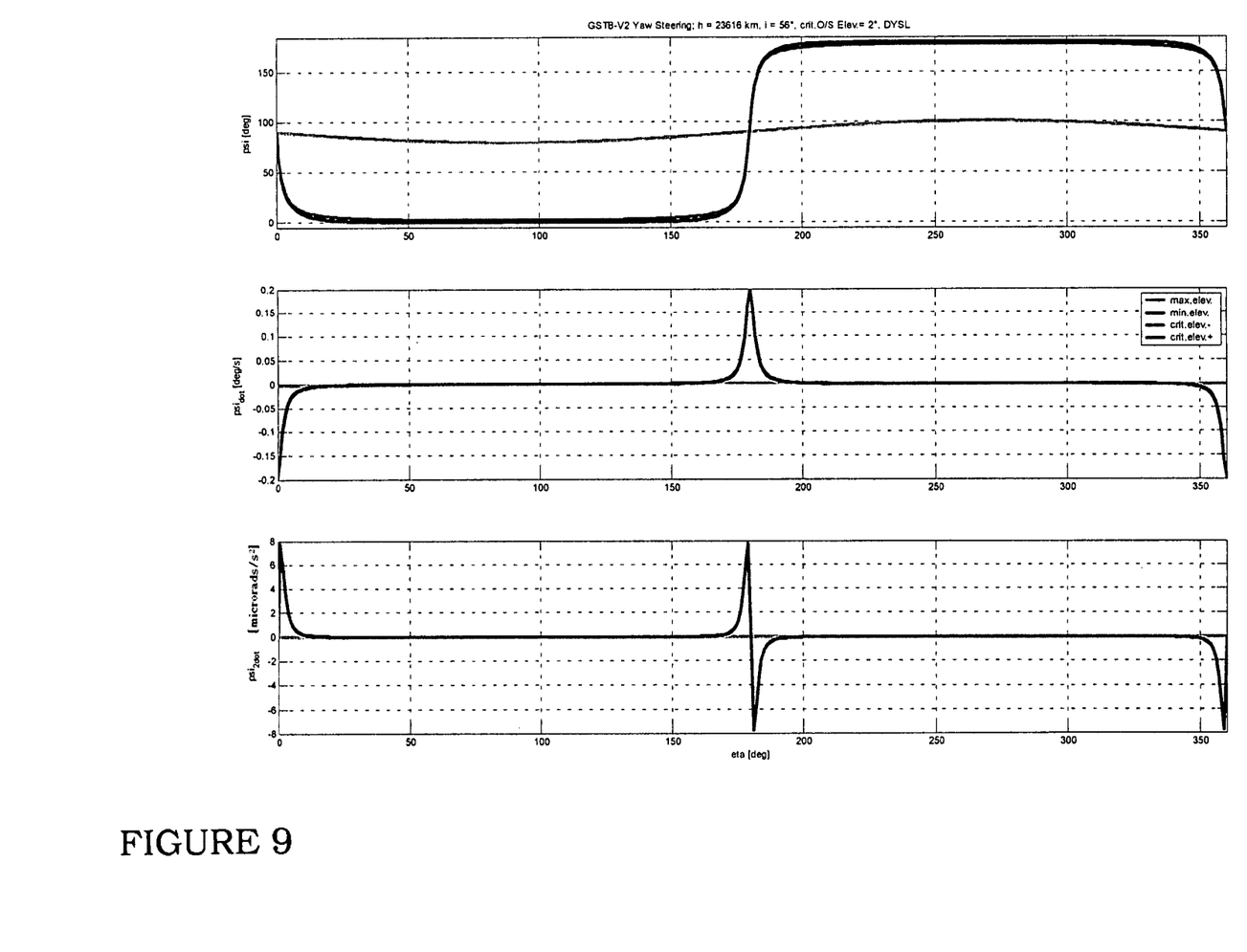
FIG. 9 shows a dynamic yaw steering for d=10: $\psi_{max,d} < \psi_{max}$ and $\ddot{\psi}_{max,d} < \ddot{\psi}_{max}$.
Figure 10:
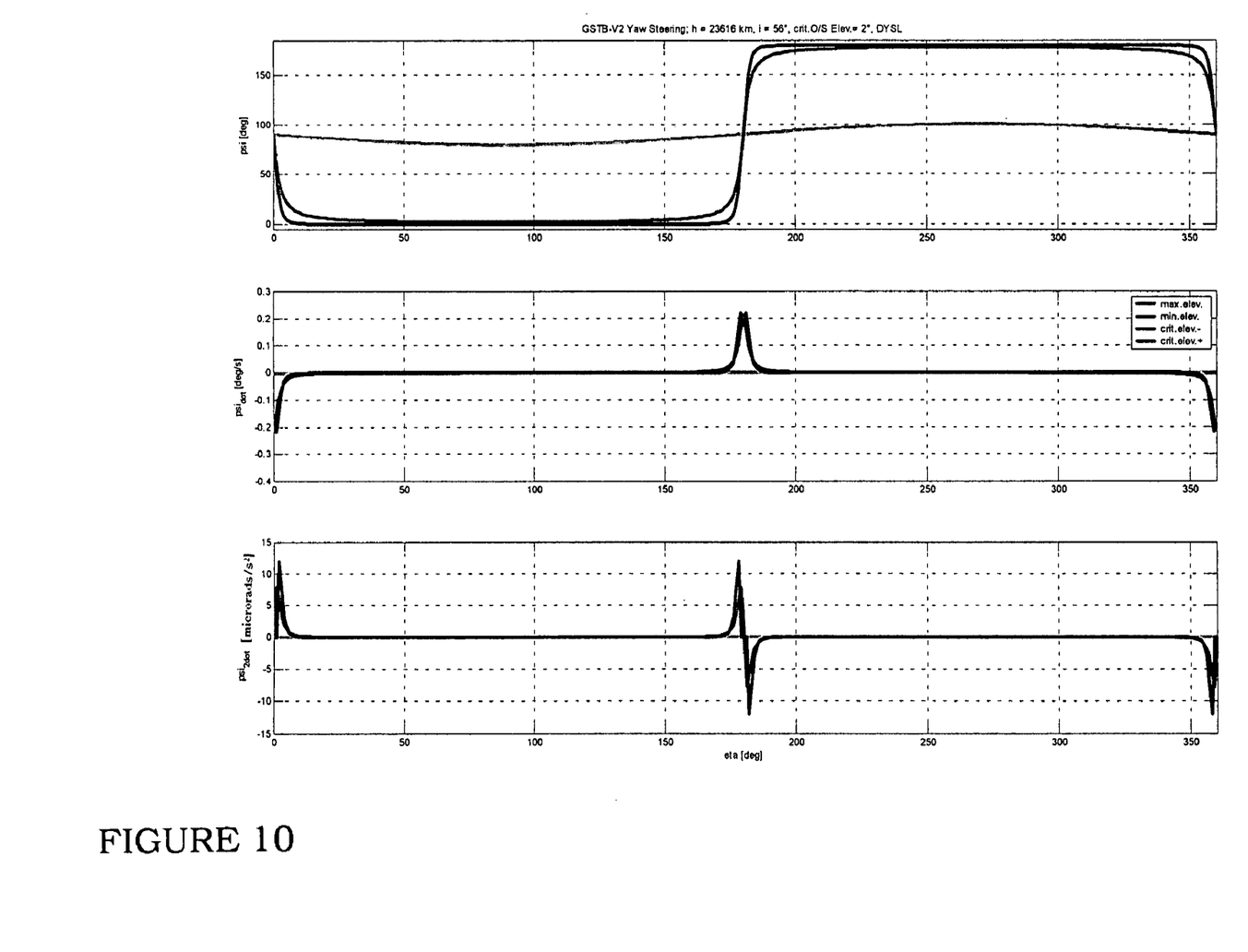
FIG. 10 shows dynamic yaw steering for d=500: $\psi_{max,d} > \psi_{max}$ and $\ddot{\psi}_{max,d} > \ddot{\psi}_{max}$.
Figure 11:
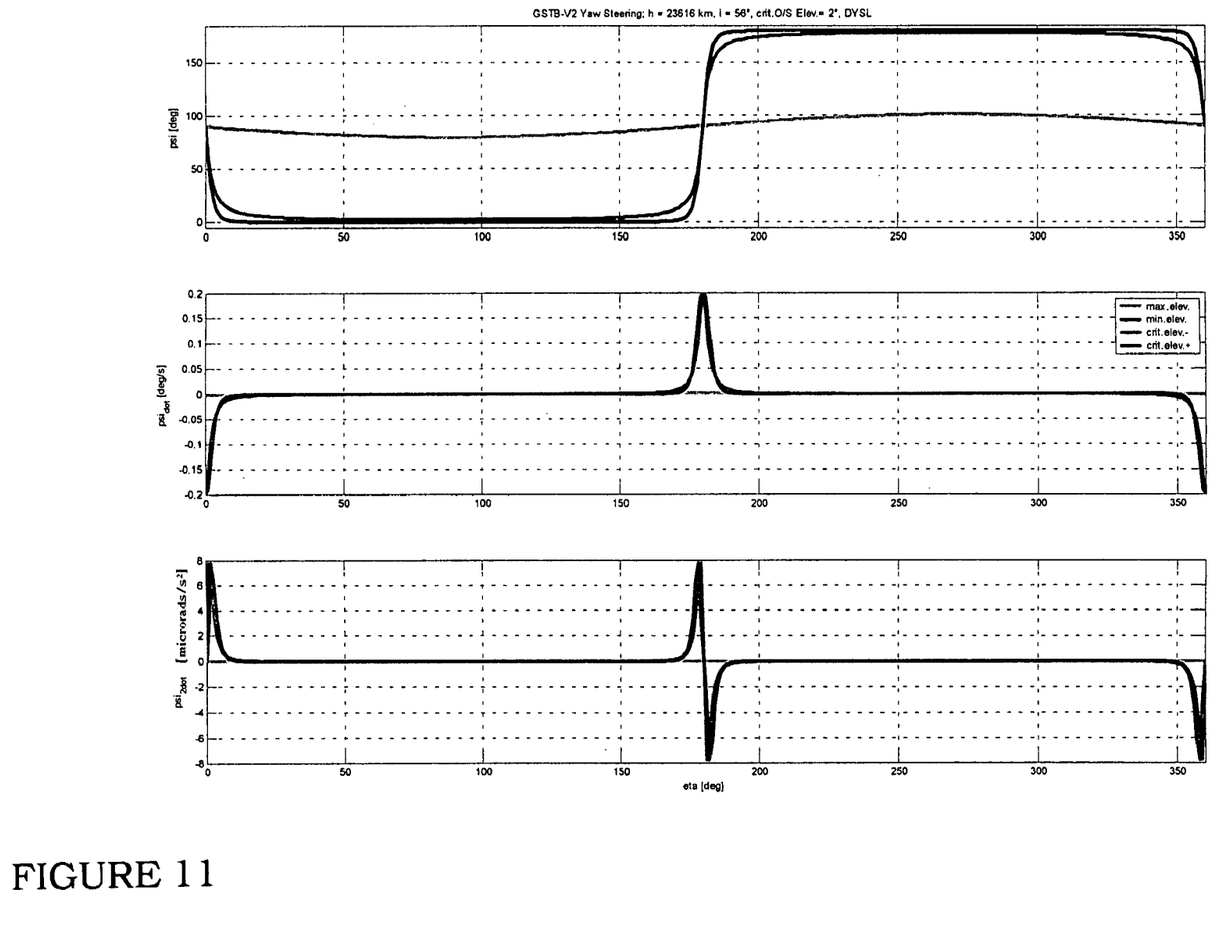
FIG. 11 shows dynamic yaw steering for d=258: $\psi_{max,d} \cong \psi_{max}$ and $\ddot{\psi}_{max,d} \cong \ddot{\psi}_{max}$.

FIGS. 9, 10 and 11 indicate the procedure, where the above results are taken for the dimensioning requirements. The parameter d has been selected as d=10, d=500, and after some iterations, the optimum d=258 for the given orbit was obtained: FIG. 9 shows the Dynamic Yaw Steering for d=10: $\dot{\psi}_{max,d}<\dot{\psi}_{max}$ and $\ddot{\psi}_{max,d}<\ddot{\psi}_{max}$; FIG. 10 shows the Dynamic Yaw Steering for d=500: $\dot{\psi}_{max,d}>\dot{\psi}_{max}$ and $\ddot{\psi}_{max,d}>\ddot{\psi}_{max}$; FIG. 11 shows the Dynamic Yaw Steering for d=258: $\dot{\psi}_{max,d}\leq\dot{\psi}_{max}$ and $\ddot{\psi}_{max,d}\leq\ddot{\psi}_{max}$.

Sun Elevation Zero Transient

From the above results, it can easily be concluded, that the optimum orbit angle $\eta_t$ for transient from the positive ($\beta>0$, $0°\leq\psi\leq+180°$) to the negative yaw steering shape ($\beta<0$, $-180°\leq\psi\leq 0$) (and vice versa) would be for $\beta\approx 0$ and either $\eta_{t1}=90°$ or $\eta_{t2}=270°$ (in principle). In order to keep the yaw steering angle numerically always in the band $-180°\leq\psi\leq+180°$ (avoiding complicated on-board modulo 360° operations) $\eta_{t1}$ is preferred.

Thus any transient between positive and negative yaw steering shapes will simply be performed for $\eta_t=90°$. However, in reality $\beta=0$ and $\eta_t=90°$ will not occur simultaneously. To overcome this problem, the following simple procedure could be applied: When approaching the $\eta_t=90°$ point, the actual Sun elevation $\beta_1=\beta(\eta_t)$ is calculated; subsequently the future Sun elevation $\beta_2=\beta(\eta_t+360°)$ for one additional orbit is calculated from orbital elements and Sun motion propagation; if no change in sign between both values $\beta_1$ and $\beta_2$ will occur ($\beta_1\cdot\beta_2>0$), the actual yaw steering shape is maintained based on the actual Sun elevation angle $\beta$, i.e. $\delta=\text{sign}(\beta_1)$; and if a change in sign between both values $\beta_1$, $\beta_2$ occurs ($\beta_1\cdot\beta_2>0$), the following procedure is applied: If $|\beta_1|\geq|\beta_2|$, the actual yaw steering shape is maintained, i.e. $\delta=\text{sign}(\beta_1)$ and the switching to the complementary shape is postponed to the next orbit; and If $|\beta_1|<|\beta_2|$, the actual shape is instantaneously switched to the complementary one, i.e. $\delta=\text{sign}(\beta_2)$.

However it should be noted that When $\beta_1$ or $\beta_2=0$, which is less likely, a numerically small value $\neq 0$ should be selected.

Evaluation of Dynamic Yaw Steering Rate and Angular Acceleration

The knowledge of yaw steering angular rate and angular acceleration is required for: Engineering purposes; and usage as feed-forward commands in the on-board control loops for dynamic tracking control improvement.

To avoid numerical differentiation, in particular for calculation of in-orbit feed-forward commands, the following provides the analytic equations for angular rate and acceleration. The differentiation procedure is rather elementary and is performed here with some substitutions in a consecutive way based on eq. 3.3.1-1 and eq. 3.1-3, introducing some basic mathematical conversions in order to avoid numerical undefined expressions. For completeness the basic equations are recalled, together with the solar array drive steering algorithms:

$|\beta|\geq\beta_0$: Kinematic Yaw Steering $$f=\dot{f}=\ddot{f}=0 \qquad \text{(eq. 3.3.4-0)}$$

$|\beta|<\beta_0$: Dynamic Yaw Steering $$f=\frac{\cos^2\eta}{1+d\cdot\sin^2\eta} \qquad \text{(eq. 3.3.4-1)}$$

$$\dot{f}=-(1+d)\cdot\omega_0\cdot\frac{\sin 2\eta}{(1+d\cdot\sin^2\eta)^2}$$

$$\ddot{f}=-2\cdot(1+d)\cdot\omega_0^2\cdot\frac{\cos 2\eta-d\cdot\sin^2\eta\cdot(1+2\cdot\cos^2\eta)}{(1+d\cdot\sin^2\eta)^3}$$

$$\beta_d=\beta+f\cdot(\beta_0\cdot\delta-\beta)$$

$$\dot{\beta}_d=\dot{f}\cdot(\beta_0\cdot\delta-\beta)$$

$$\ddot{\beta}_d=\ddot{f}\cdot(\beta_0\cdot\delta-\beta)$$

$$\delta=\pm 1 \qquad \text{(eq. 3.3.4-2)}$$

Sun elevation zero transient together
with accordingly selected value for $\delta$ as described above $$\psi=\arctan(\tan\beta_d,\sin\eta) \qquad \text{(eq. 3.3.4-3)}$$

$$u=\sin\eta\cdot\dot{\beta}_d-0.5\cdot\sin 2\beta_d\cdot\cos\eta\cdot\omega_0$$

$$v=1-\cos^2\beta_d\cdot\cos^2\eta$$

$$\dot{\psi}=\frac{u}{v}$$

$$\dot{u}=\cos\eta\cdot\omega_0\cdot\dot{\beta}_d+\sin\eta\cdot\ddot{\beta}_d-$$
$$\cos 2\beta_d\cdot\cos\eta\cdot\omega_0\cdot\dot{\beta}_d+0.5\cdot\sin 2\beta_d\cdot\sin\eta\cdot\omega_0^2$$

$$\dot{v}=\sin 2\beta_d\cdot\cos^2\eta\cdot\dot{\beta}_d+\cos^2\beta_d\cdot\sin 2\eta\cdot\omega_0$$

-continued $$\ddot{\psi} = \frac{v \cdot \dot{u} - u \cdot \dot{v}}{v^2}$$

In order to avoid discontinuities in the yaw angle ψ in the case where δ·β<0, the yaw angle has to be modified according to $\psi_i := \psi_i - \text{sign}(\psi_i - \psi_{i-1}) \cdot 2\pi$ if $|\psi_i - \psi_{i-1}| > \pi$, where i denotes the instantaneously determined yaw angle, and i−1 the yaw angle one sampling period before.

The SADM angle and rate are determined from the following expressions:

$$\sigma = \arctan(-\sqrt{1 - \cos^2\beta \cdot \cos^2\eta}, -\cos\beta \cdot \cos\eta) \quad \text{(eq. 3.3.4-4)}$$

$$\dot{\sigma} = \frac{\omega_0 \cdot \cos\beta \cdot \sin\eta}{\sqrt{1 - \cos^2\beta \cdot \cos^2\eta}}$$

If $1 - \cos^2\beta \cdot \cos^2\eta$ approaches zero, the limit value for $\dot{\sigma}$ is given by: $\dot{\sigma} = \omega_0 \cdot \text{sign}(\sin\eta)$ Thus, together with the Sun elevation zero transient, as described previous, the total set of equations is visible for implementation.

The example describes a simple yaw steering law as a supplement to the known kinematic yaw steering for application to Earth pointed satellites (here a cubic central body with perpendicularly assembled central body outer panels is assumed) combining the following features: the spacecraft is continuously Nadir pointed with one selected axis; moreover the spacecraft performs a rotation around the nadir pointed axis in order to orientate the spacecraft solar array normal in an optimal way towards the Sun, based on a state-of-the-art one-axis solar array drive mechanism; one selected spacecraft panel perpendicular to the nadir line and to the solar array axis is oriented such, that any Sun incidence is avoided (with the exception of sliding incidence); the two spacecraft panels, the panel normal of which is parallel to the solar array axes, are illuminated from the Sun with an incidence angle less than a predefined critical angle; in the critical area of small Sun elevation angles with respect to the orbit plane (yaw angle singularity, yaw flip); the yaw steering motion is continued with application of a dynamic smoothing of the rotation (Dynamic Yaw Steering), not exceeding the spacecraft actuation system capabilities and avoiding any discontinuities in yaw angle, angular rate and angular acceleration; furthermore a procedure for transition from the positive to the negative yaw steering law is derived avoiding any discontinuities in yaw angle; improvement of the closed loop attitude control dynamics tracking capabilities, together with the yaw steering reference angle profile the reference angular rate and angular acceleration profile can easily be derived; the solar array drive mechanism steering laws remain unchanged with respect to the known kinematic yaw steering reference profile; and the Sun incidence requirements with respect to the spacecraft panels can be met with a yaw error of 2° (arising e.g. from attitude control).

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A spacecraft with a yaw steering system performing yaw steering by:
    steering the spacecraft to have a yaw angle (ψ) for all sun elevation angles (β) in accordance with a yaw steering guidance law that provides a yaw steering motion about a yaw axis which is smooth for all sun elevation angles (β),
    wherein at least part of the guidance law comprises a smoothing function (f), which is a function of an orbital position parameter (η) of the spacecraft, the smoothing function (f) smoothing the yaw steering motion for values of the orbital position parameter (η) where high rotational rates $\dot{\psi}$ or high rotational accelerations $\ddot{\psi}$ would occur without the smoothing function (f).

2. A spacecraft having a steering device, the steering device performing spacecraft steering by:
    yaw steering of the spacecraft to have a yaw angle for all sun elevation angles; and
    reducing rotational rates or rotational accelerations below a predetermined value by smoothing a yaw steering motion at predetermined orbital position parameters.

3. The spacecraft according to claim 2, wherein the spacecraft steering is further performed by:
    steering the spacecraft with a yaw steering guidance law which provides a yaw steering motion about a yaw axis,
    wherein at least part of the guidance law comprises a smoothing function that is a function of an orbital position parameter of the spacecraft, the smoothing function smoothing the yaw steering motion.

4. The spacecraft according to claim 3, wherein a first part of the guidance law is applied for all sun elevation angles larger or equal to a defined sun elevation angle, in which the first part of the guidance law is independent of the smoothing function, and a second part of the guidance law is applied for all sun elevation angles smaller than a defined sun elevation angle, in which the second part of the guidance law is based on smoothing function.

\* \* \* \* \*